United States Patent
Marc

(10) Patent No.: US 8,192,316 B2
(45) Date of Patent: Jun. 5, 2012

(54) BELT WITH WEAR-RESISTANT ANTI-STATIC FABRIC

(75) Inventor: Gewald Marc, Bickenbach (DE)

(73) Assignee: The Gates Corporation, Denver, CO (US)

(*) Notice: Subject to any disclaimer, the term of this patent is extended or adjusted under 35 U.S.C. 154(b) by 630 days.

(21) Appl. No.: 12/364,607

(22) Filed: Feb. 3, 2009

(65) Prior Publication Data

US 2010/0197435 A1    Aug. 5, 2010

(51) Int. Cl.
*F16G 1/04* (2006.01)
(52) U.S. Cl. .......... 474/266; 442/229
(58) Field of Classification Search ........... 474/90, 474/204, 205, 240, 242, 244, 260, 263, 265, 474/266, 267, 268, 270; 198/846, 847; 442/229
See application file for complete search history.

(56) References Cited

U.S. PATENT DOCUMENTS

| | | | |
|---|---|---|---|
| 3,586,597 A | 6/1971 | Okuhashi | |
| 3,667,308 A * | 6/1972 | Schwab et al. | 474/263 |
| 4,247,596 A | 1/1981 | Yee | |
| 4,420,529 A * | 12/1983 | Westhead | 442/187 |
| 4,650,446 A * | 3/1987 | Pinto et al. | 474/253 |
| 4,767,389 A | 8/1988 | Habegger et al. | |
| 5,000,980 A | 3/1991 | Berger | |
| 5,351,530 A | 10/1994 | Macchiarulo et al. | |
| 5,417,619 A | 5/1995 | Tajima et al. | |
| 5,961,412 A | 10/1999 | Takahashi | |
| 6,228,448 B1 | 5/2001 | Ndebi et al. | |
| 6,703,123 B1 | 3/2004 | Shibuta et al. | |
| 6,710,242 B1 | 3/2004 | Iguro et al. | |
| 6,770,004 B1 | 8/2004 | Lofgren | |
| 7,285,591 B2 | 10/2007 | Winey et al. | |
| 7,328,785 B2 | 2/2008 | Hart et al. | |
| 2006/0160647 A1* | 7/2006 | Swane | 474/166 |

FOREIGN PATENT DOCUMENTS

| | | |
|---|---|---|
| CN | 101096775 A | 1/2008 |
| EP | 0 198 308 A1 | 10/1986 |
| EP | 1 813 316 A1 | 8/2010 |
| JP | 6-294070 A | 10/1994 |
| JP | 11-354982 A | 12/1999 |
| JP | 2007-063744 A | 3/2007 |

* cited by examiner

*Primary Examiner* — William E Dondero
(74) *Attorney, Agent, or Firm* — J. A. Thurnau, Esq.; T. A. Dougherty, Esq.; P. N. Dunlap, Esq.

(57) ABSTRACT

The invention is directed to a drive belt such as a transport or synchronous or power transmission belt with an elastomeric belt body having a drive side and a back side, a tensile member embedded in the belt body, and an anti-static, wear-resistant, covering fabric on at least one of the drive and back side. The anti-static fabric includes a nonconductive natural or synthetic polymeric fiber and a conductive fiber. The conductive fiber is a synthetic polymeric fiber with a conductive metallic coating. The metallic coating may be silver.

22 Claims, 2 Drawing Sheets

BELT WITH WEAR-RESISTANT ANTI-STATIC FABRIC

BACKGROUND OF THE INVENTION

1. Field of the Invention

This invention relates generally to thermoplastic belting, more particularly to belting with wear-resistant, anti-static fabric on a surface, and specifically to a drive belt with fabric cover containing silver-coated polymeric fiber.

2. Description of the Prior Art

Thermoplastic polyurethane ("TPU") drive belts are used for transport applications, as well as for power transmission, motion control, and timing applications. TPU belts may be in the form of flat belts, toothed belts, V-belts, multi-v ribbed belts or other special profiles. They are typically electrically insulating. It is sometimes desirable that the belts not retain electrostatic charges, i.e., that the belts have anti-static properties.

Anti-static properties generally include one or more of the following characteristics: surface resistance lower than $10^8$ ohms; volume resistance lower than $10^9$ ohms; and ground bleeder resistance lower than $10^6$ ohms/meter. Standards such as BS PD CLC/TR 50404:2003, DIN EN 13463-1, and IEC 60079-0 provide information on the avoidance of hazards due to static electricity.

U.S. Pat. No. 4,767,389 discloses a flat, plastic-covered-textile belt with anti-static properties arising from either an electrically conductive filament in the threads of the textile supporting element or an electrically conductive layer between the textile support and plastic covering. The conductive filament may be metal or carbon fiber, and the conductive layer may be soot-containing plastic. The plastic covering may be thermoplastic polyurethane. U.S. Pat. No. 7,328,785 teaches a conductive timing belt having a conductive layer of thermoplastic on the tooth surface. The thermoplastic may be conductive from the use of conductive microfibers, graphite or carbon black mixed therein.

U.S. Pat. No. 6,228,448 teaches use of an electrically conductive elastomeric surface ply which is preferably doped with a sufficient amount of carbon black or other conductive additives to give the outer ply or entire endless belt a surface resistivity of less than about $10^{14}$ ohm/square.

Metal chains are sometimes used in transport or conveying applications requiring conductivity or anti-static behavior, but the associated lubrication problems and noise are undesirable in many situations.

U.S. Pat. No. 5,417,619 teaches a covering canvas impregnated with an anti-static rubber composition based on conductive carbon black. An unwanted side effect of such coatings is a decrease in the abrasion resistance of the fabric resulting in rapid loss of the anti-static effect during use. The resulting abraded particles can be detrimental to nearby electronic or electrical components or systems. U.S. Pat. No. 5,351,530 makes use of such loss of conductivity to indicate the state of wear of a conductive-rubber-coated fabric.

It is known to incorporate so-called conductive carbon black or graphite in rubber and plastics to provide anti-static properties to the rubber or plastic composition. These compositions also generate undesirable abrasion products.

SUMMARY

The present invention is directed to systems and methods which provide anti-static properties and improved wear resistance in drive belts without adversely affecting other performance characteristics. The present invention also provides advantageous frictional properties between drive belts and associated pulley materials.

The invention is directed to a drive belt such as a transport or synchronous or power transmission belt with an elastomeric belt body having a drive side and a back side, a tensile member embedded in the belt body, and a covering fabric on at least one of the drive and back side. The fabric includes a nonconductive natural or synthetic polymeric fiber and a conductive fiber. In a preferred embodiment, the conductive fiber is a synthetic polymeric fiber with a conductive metallic coating. The conductive metallic coating is preferably silver. The fabric may have warp threads and weft threads, and the conductive fiber may be present in either or both of the warp and weft threads. In a preferred embodiment, the non-conductive fiber is a mixture of polyester and nylon fibers and the conductive fiber is continuous polyester fiber coated with silver.

The invention is also directed to a belt drive system having a drive belt as described above and at least one friction partner, such as a sprocket, pulley, slider or idler, made of a metal or a thermoplastic molding resin. Nonlimiting examples for the molding resin include nylon or polyamide ("PA"), polyphenylene sulfide, acetal, ultra-high-molecular-weight polyethylene ("UHMWPE"), polyetheretherketone, or the like, and the resin may be compounded with fillers, friction modifiers, fibers, stabilizers and/or the like. When the inventive belt is used with an UHMWPE friction partner, the friction coefficient is 2.5 to 6 times lower than observed with conventional nylon fabrics and UHMWPE. The inventive belt also has improved abrasion resistance over conventional belts, and the anti-static properties remain even after long term use.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
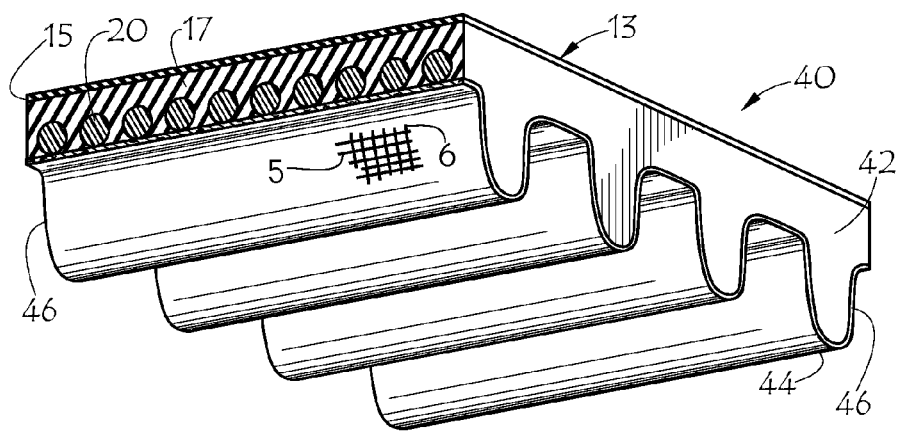
FIG. 1 is a partially fragmented perspective view of a drive belt according to an embodiment of the invention.

FIG. 1 illustrates the construction of a toothed drive belt according to an embodiment of the invention. In FIG. 1, belt 40 is formed of an elastomeric body 42 in which is embedded a strain-resistant tensile cord 20. A series of cogs or teeth 44 are disposed on the underside of the belt and adapted to mesh with corresponding teeth of a sprocket in gear-like fashion to transmit power or motion without slipping. Belt 40 employs a textile fabric 15 at the back side 13 or back surface of the belt. A layer 17 of elastomer may be interposed between cord 20 and the back fabric 15. During processing the elastomer material of layer 17 may penetrate the back fabric 15. The layer 17 and body 42 may be of the same elastomeric material, for example a thermoplastic polyurethane ("TPU") or a rubber compound or the like. The layer 17 the body 42 or both may be compounded with an antistatic ingredient or conductive filler such as carbon black, conductive carbon black, graphite, carbon fiber, metallic powder, metallic fiber, carbon nanotubes, or the like, present in an amount sufficient to impart a desired level of conductivity to the body elastomer. Belt teeth 44 also carry a textile fabric 46 on the drive side of the belt. Either the back fabric 15, the tooth fabric 46, or both may be anti-static, wear-resistant fabric according to embodiments of the invention. Other types of belts may be used in embodiments of the invention, including flat belts, V-belts, dual profile belts, belts with different profiles or purposes, and the like.

The anti-static, wear-resistant fabric is conductive because it contains conductive fibers having a metallic component such as a metallic coating. Preferably the metallic component of the conductive fibers is silver. A preferred conductive fiber is a polymeric fiber which may be synthetic or natural and which is coated with metal. The metallic coating may be silver, gold, platinum, copper, nickel, tin, zinc, palladium, or an alloy thereof. Preferably silver is the metallic coating on the conductive fiber. One or more of the conductive fibers may be blended with non-conductive natural or synthetic polymeric fibers to form a conductive yarn. The conductive yarn may be used in either the warp or the weft or both directions of a woven conductive fabric. The conductive fiber is preferably continuous fiber. Nonlimiting examples of conductive fibers believed to be useful in embodiments of the invention include those disclosed in U.S. Pat. Nos. 4,427,596, 5,000,980, 6,703,123, and 6,710,242, which are hereby incorporated herein by reference.

The anti-static, wear-resistant fabric may be woven of weft and warp yarns or threads, knitted, or non-woven. FIG. 1 illustrates one possible arrangement of warp 5 and weft 6 for tooth fabric 46. Any suitable weave or knit may be used, such as square weave, twill weave, or the like. A 2×2 twill may be used. The non-conductive polymeric fibers, as well as the base fibers of the metal-coated conductive fibers, may be any desired natural or synthetic fiber, such as polyester, nylon or polyamide ("PA"), acrylic, cotton, rayon, aramid, or the like. The fibers may be textured, twisted, blended, or the like. Hybrid, composite, or blended threads may be random fiber mixtures, twisted or cabled yarns or threads of various types, or structured such as wrapped or core-sheath yarns. Preferred fibers are polyester and polyamide, including PA-66.

According to an embodiment of the invention, a drive belt may have an elastomeric belt body having a drive side and a back side, a tensile member embedded in said body, and a covering fabric on either the drive side, or the back side or both sides. The fabric may have a first polymeric fiber and a conductive fiber, and the conductive fiber may be of a second polymeric fiber with a metallic silver coating. The first and second polymeric fibers may be of the same polymer, such as polyester or polyamide, or they may be of different polymers. The conductive fiber may be in the warp threads of the fabric, or in the weft threads of the fabric, or in both. The conductive fiber may be present or exposed at the fabric surface or surfaces.

In an embodiment of the invention, the conductive fiber may make up from about 10% to about 40% of the total weight of the fabric. In another embodiment, the fabric may be about 10% to 40%, or from 20% to 30% conductive fiber and the remainder of the fibers a combination of polyester fibers and polyamide fibers.

The fabric may be treated or coated with one or more primer, adhesion promoter, adhesive, friction modifier or binder. The fabric may be laminated to a thermoplastic film for example to prevent penetration of the elastomer of the belt body during manufacture. Other fabric variations may used as desired.

The tensile cord, if present, may be any known in the art. For example, the cord may include fibers of aramid, nylon, polyester, rayon, glass, metal, carbon, or the like, or combinations thereof.

When the conductive fiber is silver-coated polyester or polyamide, it has been found that certain frictional and wear characteristics of the inventive belt can be significantly improved. The following examples illustrate this effect. In each example the anti-static fabric comprised about 57% polyester fiber, about 20% polyamide fiber, and about 23% conductive fiber, with the conductive fiber present in both warp and weft yarns. The conductive fiber was silver-coated polyester fiber. The fabric was woven and the weight was about 200 g/m². In each comparative example, a conventional PA-66 woven fabric was used.

In a first test series, Belt Example 2 ("Ex." 2) was constructed with polyurethane belt body and silver-containing anti-static fabric on the tooth surface. The toothed belt of Ex. 2 was endless with a metric T10 profile (10 mm pitch, and trapezoidal tooth shape) and with a length of 1250 mm, i.e. 125 teeth. Comparative Example 1 ("Comp. Ex. 1") was constructed the same as Ex. 2 but with a conventional PA-66 woven fabric on the tooth surface.

Figure 2:
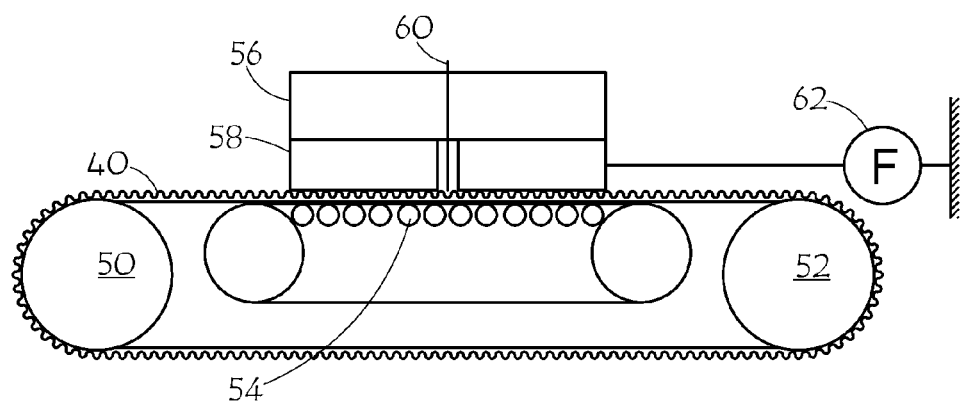
FIG. 2 is a schematic representation of a test used to characterize an aspect of the present invention.

Specimens of these two belts were subjected to a friction test, as illustrated schematically in FIG. 2. In FIG. 2, belt 40 is inverted (tooth-side out) and trained about pulleys 50 and 52. Upper span of belt 40 is slidably supported on auxiliary belt drive 54 which includes sufficient support rollers to support the vertical force of mass 56 pressing down on the upper span of belt 40. Between mass 56 and belt 40 is fixed friction partner 58. When belt 40 is driven by pulleys 50 and 52 turning counter-clockwise, with mass 56 horizontally fixed, friction is generated between the tips of the belt teeth and the surface of the friction partner. The frictional temperature at the friction interface is measured by thermometer 60, and the frictional force is measured by load cell 62. Two different friction partners were tested, steel and UHMWPE. The total projected area of belt under the friction partner was 3750 mm$^2$. This total area was used to calculate the loading pressure, even though the tooth area in actual contact with the friction partner would be smaller.

In the testing, two load conditions were used. The standard test conditions were room temperature (25° C.), a belt sliding speed of 0.5 m/s, and a loading pressure of 0.012 N/mm$^2$. A high-load test condition included the same sliding speed, but twice the loading pressure, 0.024 N/mm$^2$. In some tests, the sliding speed was increased at various times to 0.75, 1.0, 1.25, or 2 m/s. Two basic types of friction partners were tested with the inventive belt and comparative belt described above: steel and UHMWPE. Two identical machined steel plate friction partners were tested, but one natural and one contaminated or coated with a thin film of PU polymer. The test results are summarized in Table 1.

on UHMWPE. Test C and D, for the Ex. 2 on steel, show that on steel, the friction coefficient is fairly high, but the abrasion resistance is very good, since no significant damage to the belt tooth is observed. The temperature rise is pretty high, but no thermal damage or melting was observed. Test E and F, for Ex. 2 on UHMWPE, shows a very significant reduction in coefficient of friction for the inventive belt at the standard load conditions. Therefore, the test load was doubled after about 17 days, and after about 25 days, the sliding speed was increased several times over the remaining days of the test. Surprisingly, the anti-static fabric of Ex. 2 still showed no damage after 31 or 32 days of testing against UHMWPE. At the highest speeds tested, and at the high-load condition, the UHMWPE friction partner failed due to melting. Thus, Table 1 shows that an embodiment of the invention exhibits much better abrasion resistance against both steel and UHMWPE friction partners than a conventional nylon-covered belt. Also, the inventive belt exhibits much better frictional behavior with a UHMWPE friction partner than conventional nylon-covered belts, i.e., the friction coefficient is 2.5 to 6 times lower.

TABLE 1

| | Test ID | | | | | |
|---|---|---|---|---|---|---|
| | A | B | C | D | E | F |
| Belt ID | Comp. Ex. 1 | Comp. Ex. 1 | Ex. 2 | Ex. 2 | Ex. 2 | Ex. 2 |
| Friction Partner | Steel | UHMWPE | Steel | Steel (contaminated w/PU film) | UHMWPE | UHMWPE |
| Friction Speed | 0.5 m/s | 0.5 m/s | 0.5 m/s | 0.5 m/s | 26 d@0.5; +1 d@0.75 m/s +4 d@1 m/s; +1 d@1.25 m/s | 25 d@0.5; +1 d@0.75 m/s +4 d@1 m/s; +1 d@1.25 m/s +2.0 m/s |
| Load Pressure | 0.012 N/mm$^2$ | 0.012 N/mm$^2$ | 0.012 N/mm$^2$ | 0.012 N/mm$^2$ | 17 d@std load +14 d@hi-load | 0.012 N/mm$^2$ |
| Initial COF | 0.4 | 0.63 | 0.5 | 0.18 | 0.15 | 0.15-0.11 |
| Stable time | ~30 days | ~30 days | ~2 days | 7 days | 27 days | 32 days |
| Final COF | 0.65 | 0.73 | 1.2 | 0.85 | 0.11; 0.12@0.75 m/s 0.15@1 m/s failure@1.25 m/s | 0.11; 0.11@0.75 m/s 0.14@1 m/s 0.17@1.25 m/s failure@2.0 m/s |
| Test time | 30 days | 30 days | 25 days | 25 days | 31 days | 32 days |
| Average COF | 0.55 | 0.7 | 0.9 | 0.65 | 0.13 | 0.14 |
| Initial Temp. Rise | 15° C. | 60° C. | 40° C. | 34° C. | 38° C., std test | 34° C. |
| Final Temp. Rise | 23° C. | 30° C. | 57° C. | 60° C. | 43° C., hi-load 50° C.@0.75 m/s 60° C.@1.0 m/s failure@1.25 m/s | 34° C., hi-load 33° C.@0.75 m/s 38° C.@1.0 m/s 43° C.@1.25 m/s failure@2 m/s |
| Average Temp. Rise | 20° C. | 40° C. | 51° C. | 48° C. | | |
| Fabric Wear | Almost gone | Almost gone | No thermal damage | No damage | No damage | No damage |

Comp. Ex. 1 belt, illustrates typical performance of conventional belts, namely reasonably good frictional properties, but lots of abrasive wear on the tooth fabric. After 30 days of testing, the nylon fabric is mostly gone from the teeth. In test B, nylon against UHMWPE, the coefficient of friction and the temperature rise is much higher than for test A on steel.

Figure 3:
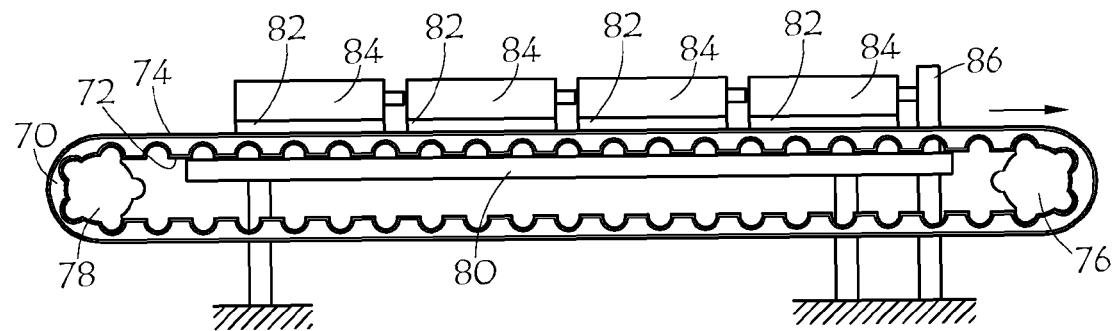
FIG. 3 is a schematic representation of another test used to characterize an aspect of the present invention.

The embodiment of the invention, the belt Ex. 2, performs better than the comparative example with respect to abrasive wear on both steel and UHMWPE and in frictional behavior For a second belt test, based on the test illustrated in FIG. 3, similar belt constructions were made as described above, but with a T5 pitch (5-mm) and with fabric on both the tooth or drive side and the back side. In the test setup of FIG. 3, two matching belts 70, with T5 profile, 25 mm wide, 3140 mm length, are trained about pulleys 76 and 78 with belt teeth 72 on the inside to mesh with matching grooves in the pulleys. The upper span of each belt 70 is slidably supported on slider plate 80 of PA-66. Weights 84 straddle both belts with PA-66 plates 82 attached to the weights and pressing on the belts' back sides. Belts 70 move in the direction shown by the large arrow, driven by an electric motor (not shown) turning driver pulley 76, and stop 86 forces the weights 84 to remain stationary as the belts slide by underneath. The belt speed is 18 m/minute, the back side contact area is 4750 mm$^2$, and the contact pressure is 0.016 N/mm$^2$. The test is run continuously, but stopped at regular intervals to check the belts and PA-66 sliders, plates or friction partners for wear. Thus, Comp. Ex. 3 has conventional polyamide woven fabric on both tooth and back side, and Ex. 4 has anti-static wear-resistant fabric on both tooth and back side, and both are constructed to fit the test of FIG. 3.

Figure 4:
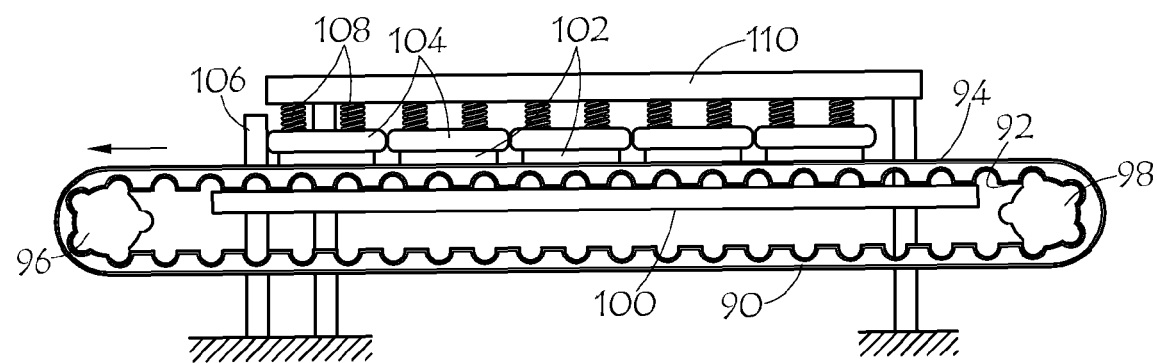
FIG. 4 is a schematic representation of another test used to characterize an aspect of the present invention.

For a third belt test, based on the test illustrated in FIG. 4, similar specimens of the previous belt constructions were made, but with a modified AT5 pitch (5-mm) and also with fabric on both the tooth and back side. In the test setup of FIG. 4, belt 90, with the AT5 profile, 30 mm wide, 2735 mm length, is trained about pulleys 96 and 98 with belt teeth 92 on the inside to mesh with matching grooves in the pulleys. The upper span of belt 90 is slidably supported on slider plate 100 of steel. Blocks 104 on the back side of belt 90 with steel plates 102 attached to the blocks and pressing on the belt back side with a force provided by springs 108. Belt 90 moves in the direction shown by the large arrow, driven by an electric motor (not shown) turning driver pulley 96, and stop 106 forces the blocks 104 to remain stationary as the belt slides by underneath. The belt speed is 25 m/minute, the back side contact area is 3540 mm$^2$, and the contact pressure is 0.028 N/mm$^2$. The test is run continuously, but stopped at regular intervals to check the belt and steel sliders, plates or friction partners for wear. Thus, Comp. Ex. 5 has conventional polyamide woven fabric on both tooth and back side, and Ex. 6 has anti-static wear-resistant fabric on both tooth and back side, and both are constructed to fit the test of FIG. 4.

Table 2 shows the results of the second and third sets of belt tests. The two-belt test of FIG. 3 is designated test G and test H on belt Comp. Ex. 3 and Ex. 4, respectively. The one-belt test of FIG. 4 is designated test I and test J on belt Comp. Ex. 5 and Ex. 6, respectively. On both testers, the inventive belts, which were covered with the anti-static fabric comprising silver-coated, conductive fibers according to an embodiment of the invention, Ex. 4 and Ex. 6, lasted much longer than the comparative nylon-covered belts. In particular, on tests G and H, the inventive belt exhibited less than half the abrasive weight loss of the comparative belt, even though test H ran longer than test G. It should be noted that test H does not represent the full useful life of the belt on the test, because the test was stopped due to equipment issues. Likewise, on tests I and J, the inventive belt lasted nearly twice as long as the comparative belt, at which time the abrasive weight loss was approximately the same for both belts, but on test I the comparative belt exhibited lots more abraded filaments exposed on the belt back than observed on the inventive belt.

After the tests the inventive belt embodiments of Ex. 4 and Ex. 6 were examined for conductivity or anti-static properties. The volume resistance and surface resistance were at least lower than 10,000 Ohms at 100 Volts, indicating good static conductivity. Certified conductivity test results were not yet completed at the time of filing.

The invention is also directed to a belt drive system having a drive belt as described above and at least one friction partner, such as a sprocket, pulley, slider or idler, made of a metal or preferably a thermoplastic molding resin. Nonlimiting examples for the molding resin include nylon or polyamide, polyphenylene sulfide, acetal, ultra-high-molecular-weight polyethylene, polyetheretherketone, or the like, and the resin may be compounded with fillers, friction modifiers, fibers, stabilizers and/or the like. When the inventive belt is used with an UHMWPE friction partner, the friction coefficient may be 2.5 to 6 times lower than observed with conventional nylon fabrics and UHMWPE. The inventive belt also has improved abrasion resistance over conventional belts, and the anti-static properties remain even after long term use. Such drive system embodiments may have general structure of the test systems illustrated in FIGS. 3 and 4, namely, pulleys, belts, support mechanisms for the belt in between the pulleys, and motor drives. Instead of sliding weights on top of the belt there might be objects being transported by the belt. Alternately the drive system may be for transmitting power between pulleys, or for synchronizing pulley motion, or the like, which might not require a support mechanism, but might also include tensioners, idlers or other components.

TABLE 2

| Test | G (FIG. 3) | H (FIG. 3) | I (FIG. 4) | J (FIG. 4) |
|---|---|---|---|---|
| Belt ID | Comp. Ex. 3 | Ex. 4 | Comp. Ex. 5 | Ex. 6 |
| Friction Partner | PA-66 | PA-66 | Steel | Steel |
| Friction Speed (m/min) | 18 | 18 | 25 | 25 |
| Load Pressure (N/mm$^2$) | 0.016 | 0.016 | 0.028 | 0.028 |
| Belt Test Time (hours) | 330 | 410+[1] | 400+[1] | 752 |
| Plate Wear | Low | Low | Low | Low |
| Belt Abrasion Loss (g) | 1.902 | 0.698 | 1.338 | 1.350 |
| Belt Wear Appearance | High abrasion at belt back | Some abrasion at back and tooth | High abrasion at belt back | Tooth abrasion |

[1]Testing not taken to complete end of belt life.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A drive belt comprising an elastomeric belt body having a drive side and a back side, a tensile member embedded in said body, and a covering fabric on at least one of said drive and back side; said fabric comprising a polymeric fiber and a conductive fiber, wherein said conductive fiber is a coated polymeric fiber with a metallic coating, and wherein the fabric comprises at least about 10% by weight of the conductive fiber.

2. The belt of claim 1 wherein said fabric comprises warp yarns and weft yarns, said conductive fiber present in at least one warp yarn and at least one weft yarn.

3. The belt of claim 1 wherein said polymeric fiber comprises polyamide or polyester.

4. The belt of claim 1 wherein said coated polymeric fiber is polyester or polyamide and said metallic coating is silver.

5. The belt of claim 1 wherein said elastomeric belt body comprises a thermoplastic polyurethane elastomer.

6. The belt of claim 5 wherein said thermoplastic polyurethane elastomer comprises a conductive filler.

7. The belt of claim 6 wherein said conductive filler is one or more selected from the group consisting of carbon black, graphite, carbon fiber, metallic powder, metallic fiber, and carbon nano-tubes.

8. The belt of claim 1 wherein the fabric comprises from about 10% to about 40% by weight of the conductive fiber.

9. A drive belt comprising an elastomeric belt body having a drive side and a back side, a tensile member embedded in said body, and a covering fabric on at least one of said drive side and back side; said fabric comprising a first polymeric fiber and a conductive fiber; said conductive fiber comprising a second polymeric fiber with a metallic silver coating; wherein the fabric comprises at least about 10% by weight of the conductive fiber.

10. The belt of claim 9 wherein said fabric comprises warp yarns and weft yarns, said conductive fiber present in at least one warp yarn and at least one weft yarn.

11. The belt of claim 10 wherein said second polymeric fiber comprises polyamide or polyester.

12. The belt of claim 11 wherein said first polymeric fiber comprises polyamide or polyester.

13. The belt of claim 12 wherein the fabric comprises from about 10% to about 40% by weight of the conductive fiber.

14. A belt drive system comprising a belt and at least one drive component comprising a thermoplastic resin friction partner; said belt comprising an elastomeric belt body having a drive side and a back side, a tensile member embedded in said body, and a covering fabric on at least one of said drive and said back side; said fabric comprising a polymeric fiber and a conductive fiber, wherein said conductive fiber is a coated polymeric fiber with a metallic coating, and wherein the fabric comprises at least about 10% by weight of the conductive fiber.

15. The belt drive system of claim 14 wherein said resin is one or a blend of more than one selected from the group consisting of ultra-high-molecular-weight polyethylene, polyamide, polyphenylene sulfide, acetal, and polyetheretherketone.

16. The belt drive system of claim 14 wherein said resin is ultra-high-molecular-weight polyethylene or polyamide.

17. The belt drive system of claim 14 wherein the drive component is a sprocket, pulley, tensioner, slider or idler.

18. The belt drive system of claim 14 wherein said resin comprises a conductive filler.

19. The belt drive system of claim 14 wherein said coated polymeric fiber is polyester or polyamide, and said metallic coating is silver.

20. The belt drive system of claim 14 wherein said resin is ultra-high-molecular-weight polyethylene.

21. The belt drive system of claim 14 wherein said resin is polyamide-66.

22. The belt of claim 14 wherein the fabric comprises from about 10% to about 40% by weight of the conductive fiber.

\* \* \* \* \*

UNITED STATES PATENT AND TRADEMARK OFFICE
CERTIFICATE OF CORRECTION

| | | |
|---|---|---|
| PATENT NO. | : 8,192,316 B2 | Page 1 of 1 |
| APPLICATION NO. | : 12/364607 | |
| DATED | : June 5, 2012 | |
| INVENTOR(S) | : Marc Gewald | |

It is certified that error appears in the above-identified patent and that said Letters Patent is hereby corrected as shown below:

Title Page, item (12);

"Marc" should read --Gewald--.

Title Page, item (75);

The name of the inventor reading "Gewald Marc" should read --Marc Gewald--.

Signed and Sealed this
Twenty-fifth Day of September, 2012

David J. Kappos
*Director of the United States Patent and Trademark Office*